United States Patent
Da Silva Marques et al.

(10) Patent No.: US 6,735,370 B1
(45) Date of Patent: May 11, 2004

(54) WAVEGUIDE FOR AN OPTICAL CIRCUIT AND METHOD OF FABRICATION THEREOF

(75) Inventors: Paulo Vicente Da Silva Marques, Valongo (PT); James Ronald Bonar, Erskine (GB); James Stewart Aitchison, Toronto (CA)

(73) Assignee: The University Court of the University of Glasgow, Glasgow (GB)

( * ) Notice: Subject to any disclaimer, the term of this patent is extended or adjusted under 35 U.S.C. 154(b) by 0 days.

(21) Appl. No.: 09/890,668

(22) PCT Filed: Feb. 7, 2000

(86) PCT No.: PCT/GB00/00322
§ 371 (c)(1), (2), (4) Date: Jan. 15, 2002

(87) PCT Pub. No.: WO00/46618
PCT Pub. Date: Aug. 10, 2000

(30) Foreign Application Priority Data

Feb. 5, 1999 (GB) ............................................. 9902479

(51) Int. Cl.⁷ ................................................ G02B 6/10
(52) U.S. Cl. ...................................... 385/129; 65/386
(58) Field of Search ................................ 385/129–132, 385/146; 65/385, 386, 394, 397–400, 427, 429; 438/29, 31

(56) References Cited

U.S. PATENT DOCUMENTS

| | | | | |
|---|---|---|---|---|
| 4,756,734 A | * | 7/1988 | Kersten et al. ................. | 65/31 |
| 4,765,819 A | * | 8/1988 | Kersten et al. ................. | 65/30.1 |
| 4,871,221 A | | 10/1989 | Imoto ...................... | 350/96.12 |
| 4,929,302 A | * | 5/1990 | Valette .......................... | 216/2 |
| 5,556,442 A | * | 9/1996 | Kanamori et al. ............ | 65/17.4 |
| 5,875,276 A | * | 2/1999 | Mahapatra et al. ......... | 385/132 |

FOREIGN PATENT DOCUMENTS

| | | | | |
|---|---|---|---|---|
| EP | 607884 A1 | | 1/1994 | |
| EP | 617301 A1 | | 3/1994 | |
| EP | 607884 A1 | * | 7/1994 | ............ G02B/6/12 |
| EP | 617301 A1 | * | 9/1994 | ............ G02B/6/12 |
| EP | 803589 A1 | | 11/1996 | |
| JP | 59 137346 A | | 8/1984 | |
| JP | 59137346 A | * | 8/1984 | ............ C03C/17/02 |
| JP | 60 191208 A | | 9/1985 | |
| JP | 62 124511 A | | 6/1987 | |

OTHER PUBLICATIONS

"Buried TI In–Diffused Waveguide on Lithium Niobate", IBM Technical Disclosure Bulletin, USA, IBM Corp., New York, vol. 33, No. 3A, Aug. 1, 1990, p 199.*

Schmidtchen J. et al.; "Germanium–Diffused Waveguides in Silicon for = 1.3 UM and = 1.55 UM with Losses below 0.5 DB/CM"; IEEE Photonics Technology Letters, USA, IEEE Inc., New York, vol. 4, No. 8, Aug. 1, 1992, pp 875–877.

* cited by examiner

Primary Examiner—Akm Enayet Ullah
Assistant Examiner—Michelle R. Connelly-Cushwa
(74) Attorney, Agent, or Firm—Lahive & Cockfield, LLP

(57) ABSTRACT

A waveguide for an optical circuit comprises a substrate; a buffer layer formed on the substrate; a doped lower cladding layer formed on the buffer layer; a doped waveguide core formed on the lower cladding layer; and a doped upper cladding layer embedding the waveguide core. The waveguide core includes mobile dopant ions which have diffused into the upper cladding layer and the lower cladding layer to form an ion diffusion region around said waveguide core such that the waveguide core boundary walls are substantially smooth. A waveguide core may be formed which is substantially symmetric about its core axis. Methods of fabricating the waveguide are also described.

50 Claims, 3 Drawing Sheets

WAVEGUIDE FOR AN OPTICAL CIRCUIT AND METHOD OF FABRICATION THEREOF

FIELD OF THE INVENTION

The present invention relates to a waveguide for an optical circuit, and a method of fabrication thereof.

The method relates in particular to the fabrication of a waveguide for an optical circuit with smoothed waveguide core boundaries. More specifically, the method relates to the fabrication of a rounded, elliptical or circular waveguide core by the isotropic diffusion of dopants in a core layer of a phosphosilicate waveguide wafer, such that the diffused core layer forms the circular waveguide core. In this manner, a core may be formed which is symmetric about the core axis.

This diffusion is thermally promoted either during the deposition of an uppercladding layer or by subsequent thermal processing of the waveguide wafer.

BACKGROUND OF THE INVENTION

The general process of fabricating a glass waveguide for optical circuits comprises forming at least one buffer layer, e.g. a thermal oxide layer, on a silicon wafer substrate. Additional buffer layers and/or at least one lower cladding layers may then be formed on top of the buffer layer. A core layer composed of a doped silica film is then formed on top of the buffer layer or lower cladding layer.

The core layer is then etched, for example, by reactive ion techniques, to form a square or rectangular waveguide or other suitable cross-sectional profile. The etched core is then embedded by an upper cladding layer. The core layer refractive index is usually higher than that of the surrounding layers. This concentrates the propagation of light in the core layer.

Planar channel waveguides are usually formed using dry etch methods to produce waveguides with square or rectangular cross-sections. Such angular waveguides have several disadvantages, in particular the geometrical mismatch between the waveguides and optical fibres in an optical circuit. The production of channel waveguides with a circular cross-section is particularly advantageous in that this increases the transmission efficiency between the waveguide and the rest of an optical circuit.

Channel waveguides are also susceptible to scatter loss (Mie scattering) due to imperfections in their sidewalls. This is reduced by smoothing the profile of the waveguide and this provides low propagation loss in the waveguides.

Circular optical waveguides are known in principle (for example, see Sun et al., "Silica-based circular cross-sectioned channel waveguides", IEEE Photonics Technology Letters, 3, p.p. 238–240, 1991). Sun et al., disclose large dimension (~50 $\mu$m) $GeO_2$ doped silica waveguides which are reactive ion etched to form rectangular channel cross-sections. This method involves depositing a lower cladding layer with a reduced amount of Germanium doped silicon on to the wafer substrate prior to the deposition of a core layer. When the wafer is placed in the selective wet etch, the lower cladding layer is etched at a much faster rate to form a pedestal underneath the core region.

According to Sun et al., the waveguide can then be heated above the core softening temperature so that the surface tension of the glass functions to round the waveguide core. Such wet etching techniques are time consuming and moreover, do not offer truly circular cross sections as the core cannot be rounded at the interface between the core layer and the pedestal (i.e., the lower cladding layer lying directly beneath the core).

The current invention in contrast relies on the mobility of dopant ions in a square or rectangular etched core to migrate outwards into both upper and lower cladding layers. This forms waveguides which have substantially smoothed boundary walls, in particular the side walls are smoothed.

Further diffusion rounds the core region, and providing the diffusion is sufficiently isotropic the core region becomes sufficiently rounded to form a circular waveguide. This diffusion is thermally promoted either during the consolidation of the upper cladding layer or during subsequent thermal processing. By selecting the composition of the upper and lower cladding layers, the refractive indexes and consolidation temperatures can be chosen to modify the rate at which the core dopant ions diffuse into each layer and the elipticity of the resulting waveguide core accordingly adjusted.

SUMMARY OF THE INVENTION

According to a first aspect of the present invention, there is provided a waveguide for an optical circuit comprising:
  a substrate;
  a doped lower cladding layer;
  a doped waveguide core formed on the lower cladding layer; and
  a doped upper cladding layer embedding the waveguide core;
  wherein the waveguide core includes mobile dopant ions which have diffused into the upper cladding layer and the lower cladding layer to form an ion diffusion region around said waveguide core such that the waveguide core boundary walls are substantially smooth.

Preferably, the waveguide further includes a buffer layer formed on the substrate and wherein the lower cladding layer is formed on the buffer layer. The substrate may comprise silicon and/or silica and/or sapphire. The buffer layer may include a thermally oxidised layer of the substrate.

Preferably, the buffer layer comprises doped silica.

Preferably, the thickness of the buffer layer is in the range 0.2 $\mu$m to 20 $\mu$m.

The lower cladding layer may comprise doped silica. The lower cladding layer may include at least one Phosphorus oxide and/or at least one Boron oxide.

Preferably, the lower cladding layer includes at least one Phosphorus oxide and at least one Boron oxide, wherein the Phosphorus oxide to Boron oxide ratio is such that the lower cladding layer refractive index is substantially equal to the refractive index of the buffer layer.

The lower cladding layer may include doped silica, at least one Phosphorus oxide and at least one Boron oxide, wherein the silica:Phosphorus oxide:Boron oxide ratio is in the range of 75 to 95 wt % silica:1 to 7 wt % Phosphorus oxide:4 to 18 wt % Boron oxide.

Preferably, the lower cladding layer has a silica:Phosphorus oxide:Boron oxide ratio in the range of 80 to 90 wt % silica:2.5 to 6 wt % Phosphorus oxide:7.5 to 14 wt % Boron oxide.

More preferably, the lower cladding layer has a silica; to Phosphorus oxide; to Boron oxide ratio of 82 wt % silica; to 5 wt % Phosphorus oxide; to 13 wt % Boron oxide.

Preferably, the thickness of the lower cladding layer is 1 $\mu$m to 20 $\mu$m.

The waveguide core may comprise doped silica. The mobile dopant ions of the waveguide core may include Phosphorus and/or Fluorine and/or compounds of these elements. Dopant ions of the waveguide core may include Phosphorus and/or Fluorine and/or Aluminium and/or Boron and/or Germanium and/or Tin and/or Titanium and/or compounds of these elements.

Preferably, the waveguide core includes Phosphorus oxide and/or Boron oxide. More preferably, the waveguide core comprises $P_2O_5$—$SiO_2$.

Preferably, the refractive index of the waveguide core differs from that of the lower cladding layer by at least 0.05%.

Preferably, the waveguide core includes silica, and at least one Phosphorus oxide, wherein the silica to Phosphorus oxide ratio is in the range of 75 to 95 wt % silica to 5 to 25 wt % Phosphorus oxide.

More preferably, the waveguide core has a silica to Phosphorus oxide ratio of 80 wt % silica to 20 wt % Phosphorus oxide.

Preferably, the thickness of the waveguide core is in the range 2 $\mu$m to 60 $\mu$m.

More preferably, the thickness of the waveguide core is 6 $\mu$m.

Preferably, the lower cladding layer and the upper cladding layer refractive indices are substantially equal. The lower cladding layer and the upper cladding layer may comprise the same material.

Preferably, the waveguide core has a mobile ion dopant concentration higher than the mobile ion dopant concentration of the lower cladding layer or the upper cladding layer.

Preferably, the ion diffusion region is isotropic with respect to the waveguide core.

Preferably, the ion diffusion region surrounding the waveguide core forms a substantially rounded waveguide core.

More preferably, the rounded waveguide core is elliptical or circular in cross-section.

According to a second aspect of the invention, there is provided a method of fabricating a waveguide comprising the steps of: providing a substrate; forming a doped lower cladding layer; forming a doped core layer on the lower cladding layer; forming a waveguide core from the core layer; forming a doped upper cladding layer to embed the waveguide core; wherein mobile ion dopants included in the core layer undergo diffusion into the surrounding upper cladding layer and lower cladding layer to form an ion diffusion region around the waveguide core such that the waveguide core boundary walls are substantially smooth.

The method may include the step of forming a buffer layer on the substrate. The lower cladding layer may be formed on said buffer layer. The steps of forming each of the lower cladding layer, the core layer and the upper cladding layer may comprise the steps of: depositing each layer; and at least partially consolidating each layer.

Preferably any of the lower cladding layer, the core layer and the upper cladding layer partially consolidated after deposition is fully consolidated with the full consolidation of any other of the lower cladding layer, the core layer or the upper cladding layer.

Preferably, the diffusion of mobile ion dopants in the core layer occurs during the consolidation of the lower cladding layer and/or the upper cladding layer.

The method may further comprise at least one thermal processing step after the formation of the upper cladding layer, wherein during said thermal processing of the waveguide the mobile ion dopants in the core layer undergo diffusion into the surrounding layers. The substrate may comprise silicon and/or silica and/or sapphire. The buffer layer may include a thermally oxidised layer of the substrate. The buffer layer may comprise doped silica.

Preferably, the thickness of the buffer layer formed is in the range of 0.2 $\mu$m to 20 $\mu$m. The lower cladding layer may comprise doped silica. The lower cladding layer may include at least one Phosphorus oxide and/or Boron oxide. The lower cladding layer may include at least one Phosphorus oxide and at least one Boron oxide, wherein the Phosphorus oxide to Boron oxide ratio is such that the lower cladding layer refractive index is substantially equal to the refractive index of the buffer layer.

Preferably, the lower cladding layer includes silica, at least one Phosphorus oxide and at least one Boron oxide, wherein the silica; to Phosphorus oxide; to Boron oxide ratio in the range of 75 to 95 wt % silica; to 1 to 7 wt % Phosphorus oxide; to 4 to 18 wt % Boron oxide.

Preferably, the lower cladding layer has a silica; to Phosphorus oxide; to Boron oxide ratio in the range of 80 to 90 wt % silica; to 2.5 to 6 wt % Phosphorus oxide; to 7.5 to 14 wt % Boron oxide.

More preferably, the lower cladding layer has a silica; to Phosphorus oxide; to Boron oxide ratio of 82 wt % silica; to 5 wt % Phosphorus oxide; to 13 wt % Boron oxide.

Preferably, the thickness of the lower cladding layer is 1 $\mu$m to 20 $\mu$m.

Preferably, the core layer comprises doped silica. The mobile dopant ions of the waveguide core may include Phosphorus and/or Fluorine and/or compounds of these elements. The dopant ions of the waveguide core may include Phosphorus and/or Fluorine and/or Aluminium and/or Boron and/or Germanium and/or Tin and/or Titanium and/or compounds of these elements.

The core layer may include Phosphorus oxide and/or Boron oxide.

Preferably, the core layer comprises $P_2O_5$—$SiO_2$.

Preferably, the refractive index of the waveguide core differs from that of the lower cladding layer by at least 0.05%.

Preferably, the waveguide core includes silica and at least one Phosphorus oxide, wherein the silica to Phosphorus oxide ratio is in the range of 75 to 95 wt % silica to 5 to 25 wt % Phosphorus oxide.

More preferably the waveguide core has a silica to Phosphorus oxide ratio of 80 wt % silica to 20 wt % Phosphorus oxide.

Preferably, the thickness of the waveguide core is in the range 2 $\mu$m to 60 $\mu$m.

More preferably, the thickness of the waveguide core is 6 $\mu$m.

Preferably, the lower cladding layer and said buffer layer are formed substantially in the same step.

Preferably, the consolidation of the lower cladding layer is at a temperature or temperatures in the range 950° C. to 1400° C.

Preferably, the consolidation of the lower cladding layer is at a temperature or temperatures in the range 1100° C. to 1350° C.

Preferably, the consolidation of the core layer is at a temperature or temperatures in the range 950° C. to 1400° C.

More preferably, the consolidation of the core layer is at a temperature or temperatures in the range 1100° C. to 1385° C.

Preferably, the consolidation of the upper cladding layer is at a temperature or temperatures in the range 950° C. to 1400° C.

More preferably, the consolidation of the upper cladding layer is at a temperature or temperatures in the range 1100° C. to 1350° C.

The temperature or temperature range at which the lower cladding layer is consolidated may be greater than the temperature or temperature range at which the core is consolidated. The temperature or temperature range at which the upper cladding layer is consolidated may be substantially equal to the temperature or temperature range at which the core layer is consolidated.

At least one of the lower cladding layer, the core layer, and the upper cladding layer may be deposited by a Flame Hydrolysis Deposition process and/or Chemical Vapour Deposition process. The Chemical Vapour Deposition process may be a Low Pressure Chemical Vapour Deposition process or a Plasma Enhanced Chemical Vapour Deposition process.

Preferably, the consolidation is by fusing using a Flame Hydrolysis Deposition burner. Alternatively, the consolidation may be by fusing in a furnace.

Preferably, the step of fusing the lower cladding layer and the step of fusing the core layer are performed simultaneously.

Preferably, the waveguide core formed from the core layer is square or rectangular in cross-section.

The waveguide core may be formed from the core layer using a dry etching technique and/or a photolithographic technique and/or a mechanical sawing process.

The dry etching technique may comprise a reactive ion etching process and/or a plasma etching process and/or an ion milling process.

Preferably, the diffusion of the said mobile dopant ions from the waveguide core is isotropic.

Preferably, the diffusion of the said mobile dopant ions from the waveguide core swells the boundary walls of the waveguide core.

More preferably, diffusion of the said mobile dopant ions swells the boundary walls of the waveguide core to form a substantially rounded waveguide core.

The rounded waveguide core formed may be elliptical or circular in cross-section.

The smoothing of the walls reduces scattering losses and lowers the propagation losses for the waveguides. Coupling losses between optical circuits and optical fibre are also reduced due to the improved geometry of the waveguide core. For example, the enhanced roundedness of the core of the waveguide enables it to be coupled more efficiently to optical fibre which has an appropriate circular or elliptical cross-section.

DESCRIPTION OF THE DRAWINGS

Embodiments of the present invention will now be described by way of example only with reference to the accompanying drawings in which.

DETAILED DESCRIPTION OF THE INVENTION

With reference to the drawings, there is described now a waveguide for an optical circuit and a method of fabrication thereof according to the present invention.

Figure 1:
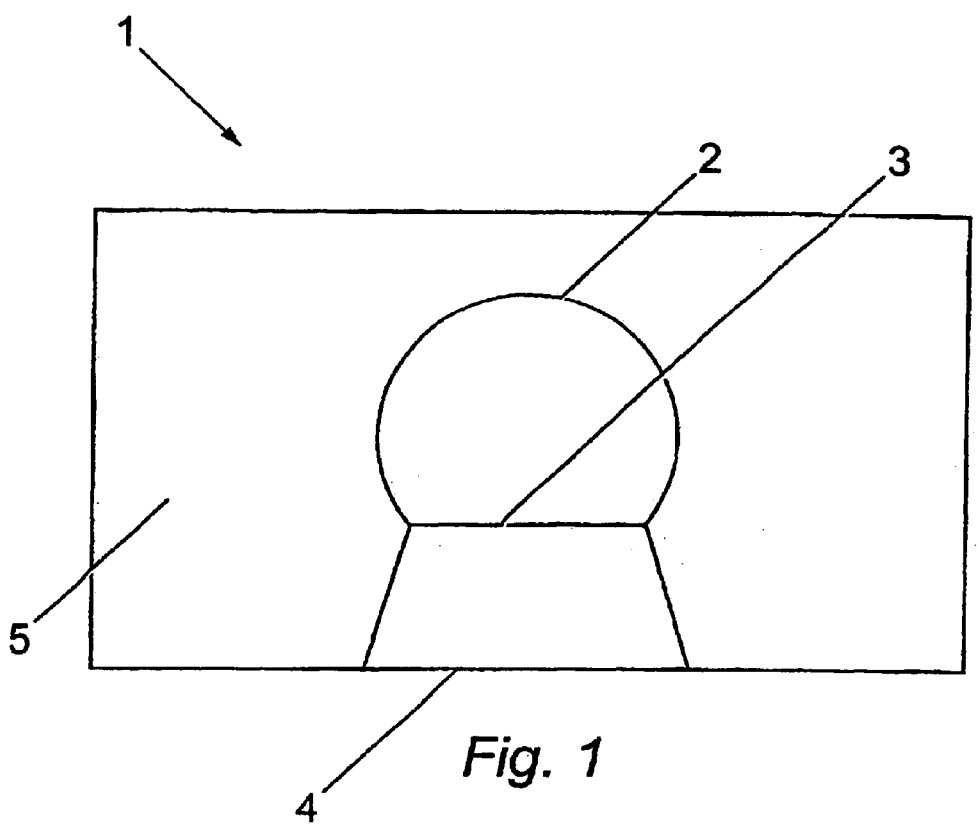
FIG. 1 is a cross-sectional diagram of a conventionally rounded waveguide.

A waveguide produced by conventional techniques which can partially round the cross-section of the core layer of a waveguide is shown in FIG. 1. This illustrates such a waveguide 1 with a rounded core upper cross-section 2 and flat base 3 supported by a pedestal 4 embedded in a cladding layer 5 as might be formed by the conventional method of Sun et al.

The present invention provides a waveguide which does not exhibit the flat base 3 shown in FIG. 1. Various stages in the method of fabricating such a waveguide will now be described with reference to FIGS. 2A to 2E.

Figure 2A:
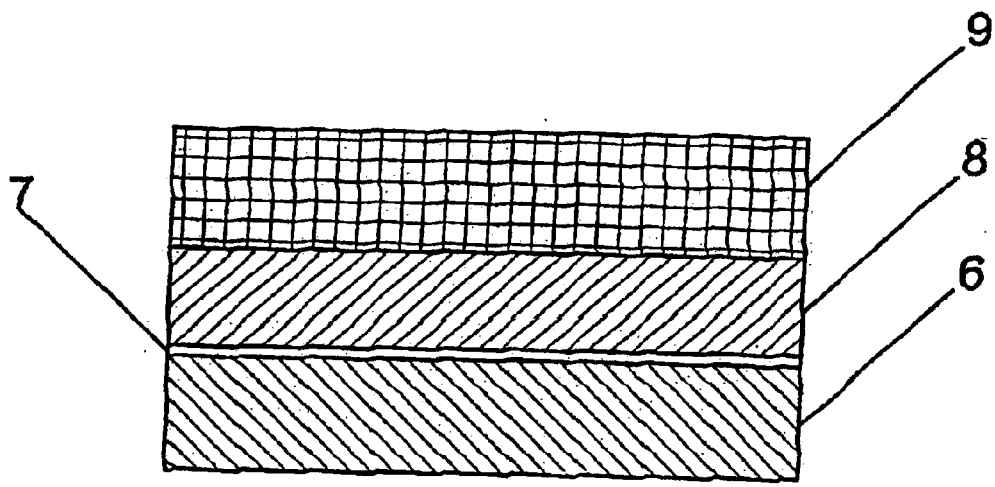
FIGS. 2A to 2E are a cross-sectional diagrams showing stages in the fabrication of a rounded waveguide according to the present invention.

FIG. 2A is a schematic diagram showing the preliminary stages in a method of fabricating a waveguide with an elliptical or rounded cross-section from a silicon wafer according to a first embodiment of the invention.

In this embodiment, a silicon substrate 6 is covered with a buffer layer 7 comprising thermally oxidised silicon. In alternative embodiments of the invention, the substrate 6 comprises silica and sapphire and the buffer layer 7 further includes at least one Phosphorus oxide and/or Boron oxide. The thickness of the thermally oxidised silicon buffer layer 7 ranges between 0.2 $\mu$m and 20 $\mu$m.

A lower cladding layer 8, doped with Phosphorus and Boron ions (although other dopants may be substitued/added in alternative embodiments of the invention, in which for example, the lower cladding layer may be doped primarily with Phosphorus and Boron) and having a refractive index matched to the buffer layer 7, is then deposited using a Flame Hydrolysis Deposition (FHD) process on to the buffer layer 7, and is consolidated either in an electrical furnace or by using an FHD burner.

By way of example, the FHD process used for deposition of the lower cladding layer 8 can employ the following input feed flow rates for the feed gases:

Shroud gas 5 litres/min; $O_2$ 4 litres/min;

$H_2$ 2 litres/min; $SiCl_4$ carrier gas 0.15 litres/min;

$PCl_3$ carrier gas 0.04 litres/min;

$BCl_3$ carrier gas 0.09 litres/min. The halides are carried, for example, by an $N_2$ carrier gas, and the shroud gas can, for example, be $N_2$.

In this embodiment of the invention, the lower cladding layer 8 formed comprises silica, Phosphorus oxide, and Boron oxide; for example $SiO_2$—$P_2O_5$—$B_2O_3$. In alternative embodiments, the lower cladding layer 8 may contain dopant ions in addition to $SiO_2$—$P_2O_5$—$B_2O_3$. The doping levels for the silica, Phosphorus oxide and Boron oxide in the lower cladding layer 8 are 82 wt % silica, 5 wt % Phosphorus oxide and 13 wt % Boron oxide. Varying the flow rates of the input gases in the FHD burner results in different doping levels. In other embodiments of the invention, the preferred doping levels range between 75 to 95 wt % silica, 1 to 7 wt % Phosphorus oxide and 4 to 18 wt % Boron oxide, or alternatively range between 80 to 90 wt % silica, 2.5 to 6 wt % Phosphorus oxide, and 7.5 to 14 wt % Boron oxide. Other suitable cladding layer materials may be used and suitably doped in alternative embodiments of the invention.

The lower cladding layer 8 is consolidated by fully fusing the layer in an electric furnace at a temperature of 1250° C., which is in a preferred range of temperatures of between 1100° C. to 1350° C.

In alternative embodiments, the lower cladding layer 8 is deposited using an FHD process and can be consolidated at different temperatures within a range of temperatures of between 950° C. to 1400° C.

In a further alternative, the lower cladding layer 8 is deposited by a Flame Hydrolysis Deposition (FHD) process and partially consolidated at this stage and fully consolidated subsequently.

The thickness of the lower cladding layer 8 deposited is 2 $\mu$m but can range between 1 $\mu$m and 20 $\mu$m.

In alternative embodiments, where no buffer layer is employed, the lower cladding layer 8 can be formed directly on top of the substrate 6.

A core layer 9 comprising Phosphorus oxide and silica, for example, $P_2O_5$—$SiO_2$ is then formed on the lower cladding layer 8. The refractive index of the core layer 9 differs from that of the lower cladding layer 8 by 0.75%, and may differ by a value within the range of 0.05% to 2%.

By way of example, the FHD process used for deposition of the core layer 9 can employ the following input feed flow rates for the feed gases:

Shroud gas 5 litres/min; $O_2$ 6 litres/min;
$H_2$ 4 litres/min; $SiCl_4$ carrier gas 0.15 litres/min;
$PCl_3$ carrier gas 0.018 litres/min. The halides are carried, for example, by an $N_2$ carrier gas, and the shroud gas can, for example, be $N_2$.

The core layer 9 is consolidated by fully fusing the layer in an electric furnace at a temperature of 1200° C., which is in a preferred range of temperatures of between 1100° C. to 1385° C.

In alternative embodiments, the core layer 9 is deposited using an FHD process and can be consolidated at different temperatures within a range of temperatures of between 950° C. to 1400° C.

In a further alternative, the core layer 9 is partially consolidated at this stage and consolidated subsequently.

The dopant levels for the core layer 9 are 80 wt % silica and 20 wt % Phosphorus oxide in the preferred embodiment. In alternative embodiments, the input gases into the FHD burner are varied to give core dopant levels between 75 to 95 wt % silica and 5 to 25 wt % Phosphorus oxide respectively. The thickness of the core layer deposited is 6 μm but can range between 2 μm and 60 μm.

The core layer mobile ion dopants include Phosphorus ions but could, for example, include Fluorine ions. In alternative embodiments, the core layer 9 is doped Phosphorus and co-doped with ions with desired properties to effect reduction of the sintering temperature and/or to effect increase of the core layer refractive index. The co-dopants may be selected from the group comprising Aluminium, Boron, Germanium, Tin and/or Titanium. For example, co-doping with Germanium reduces the sintering temperature and raises the silica based core layer 9 refractive index so that the refractive index is higher than the refractive index of the lower cladding layer 8 on top of which the core layer 9 is deposited.

The lower cladding layer 8 is susceptible to interdiffusion from the dopant ions from the core layer 9. In contrast, the buffer layer 7 acts as a barrier against interdiffusion.

Figure 2B:
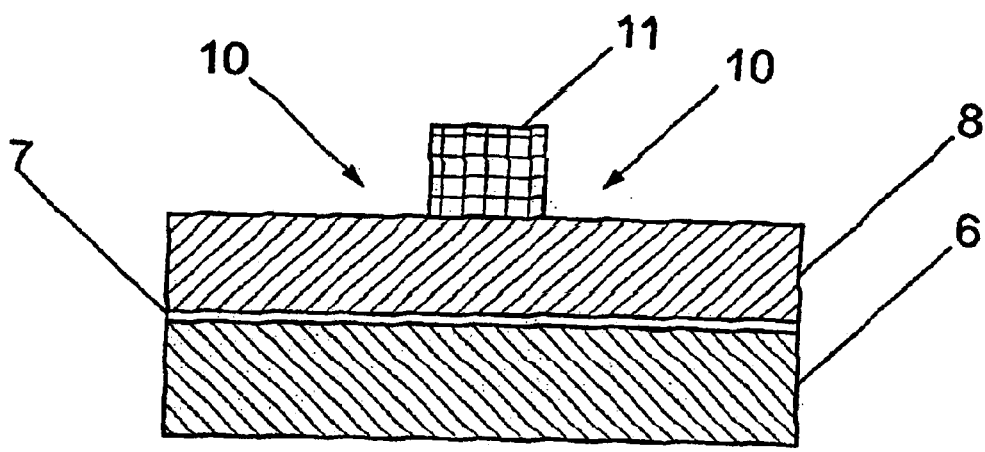

FIG. 2B shows the subsequent stage in the method of fabricating an optical waveguide in which the core layer 9 is redefined by removing regions 10 by a reactive ion etching (RIE) technique to form a square waveguide core 11. In general, a square or rectangular waveguide core 11 whose dimensions range from 2 μm to 60 μm will be suitable in the method of fabricating an optical waveguide, preferred dimensions being such as to give a waveguide core 11 of 6 μm×6 μm.

Alternative techniques for forming a square or rectangular waveguide core 11 can be used, or a combination of techniques. For example, dry etching techniques (e.g. reactive ion etching, ion milling, and/or plasma etching processes), a photolithographic technique, and/or a mechanical sawing process may be used.

Figure 2C:
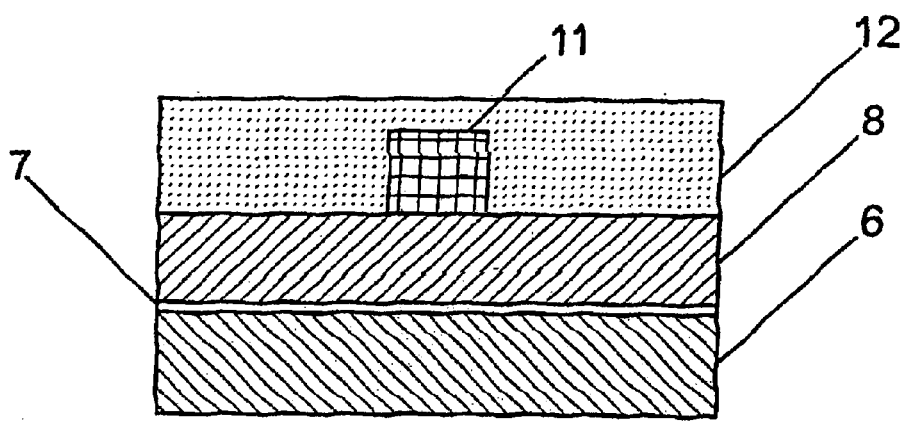

Subsequently, the waveguide core 11 is surrounded by, or embedded in, an upper cladding layer 12 (as shown in FIG. 2C) comprising Phosphorus oxide, Boron oxide and silica.

Preferably, the upper cladding layer 12 has the same composition as the lower cladding layer 8 ($P_2O_5$—$B_2O_3$—$SiO_2$) and the same refractive index. Alternatively, the upper cladding layer 12 can have a different composition from the lower cladding layer 8 but can have substantially the same refractive index. The upper cladding layer 12 can be deposited using the same input gas flow parameters into the FHD apparatus as for the lower cladding layer 8.

The upper cladding layer 12 is then consolidated in a furnace and by adjusting the duration and temperature of the heat treatment the amount of diffusion of the dopant ions in the waveguide core 11 can be adjusted.

The upper cladding layer 12 is consolidated by fully fusing the upper cladding layer 12 in an electric furnace for about 90 minutes at a minimum temperature of 1050° C. and preferably at a temperature of 1200° C., which is in a preferred range of temperatures of between 1100° C. to 1250° C.

The consolidation temperature of the upper cladding layer 12 is a minimum of 1050° C. for the given co-dopant levels. In alternative embodiments, for other co-dopant levels, the upper cladding layer 12 is deposited using an FHD process and can be consolidated at different temperatures within a range of temperatures of between 950° C. to 1250° C. By suitably varying the co-dopant levels in the upper cladding layer 12 the consolidation temperature can be reduced to below 950° C.

Figure 2D:
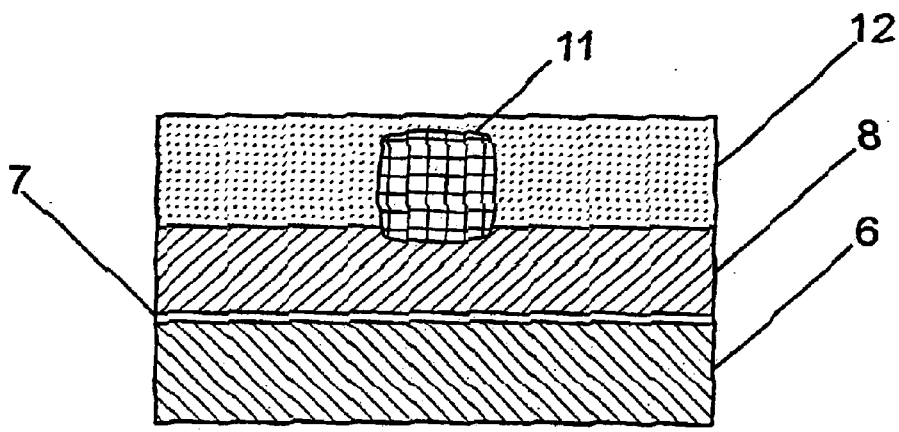

FIG. 2D shows how the consolidation temperature of the upper cladding layer 12 promotes diffusion of the mobile core dopant ions into the upper cladding layer 12 and lower cladding layer 8. The composition of the upper and lower cladding layers 8 and 12 gives a diffusion length of 2 μm when the consolidation temperature of the core layer 9 and upper cladding layer 12 is 1200° C. More typically, the diffusion length is between the range of 0.1 μm to 3 μm for the preferred ranges of consolidation temperatures.

The upper cladding layer 12 is consolidated at a temperature which is the same as or greater than a temperature which promotes efficient diffusion of the waveguide core 11.

The ion dopant concentration in the lower cladding layer 8 and upper cladding layer 12 is chosen so that the waveguide core 11 has a higher concentration of dopant ions to promote diffusion of the waveguide core 11 dopant ions into the lower cladding layer 8 and upper cladding layer 12. In the preferred embodiment, the diffusion of the mobile ion dopants in the waveguide core 11 into the surrounding cladding layers 8 and 12 occurs during consolidation of the upper cladding layer 12, during which the core boundaries of the waveguide core 11 are rounded and a waveguide 13 is formed which is circular in cross-section.

In an alternative embodiment, subsequent thermal processing after the consolidation of the upper cladding layer 12 promotes diffusion of the mobile ion dopants in the waveguide core 11 into the surrounding cladding layers 8 and 12.

Figure 2E:
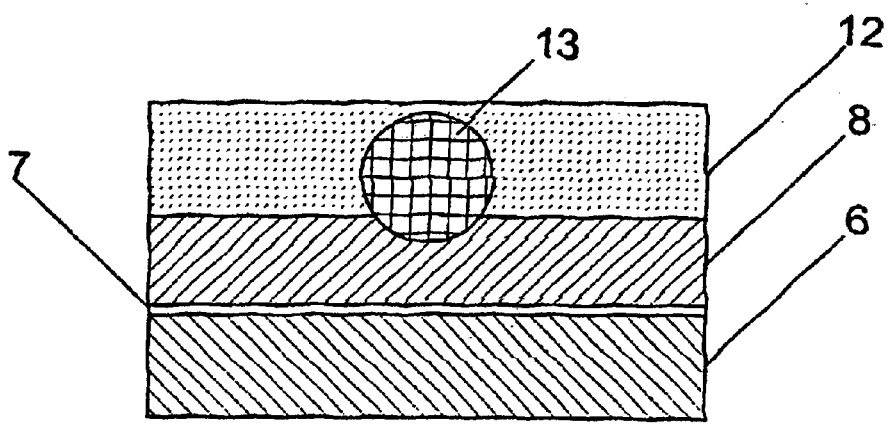

FIG. 2E shows the resulting rounded waveguide 13.

In other embodiments of the invention, a silica based waveguide core 11 may be doped with Phosphorus and Germanium to raise the refractive index of the waveguide core 11 and to reduce the consolidation temperature of the waveguide core 11. Alternative techniques may be used to redefine the waveguide core 11 from the core layer 9; e.g. photolithographic, plasma etching processes, ion milling process, mechanical sawing process, and RIE processes.

In other embodiments, the waveguide core 11 may comprise more than one core layer 9. Such core layers 9 could be chosen to have substantially the same refractive index but differ in material composition.

Other embodiments of the invention may require additional interdiffusion upper cladding layers 12 and lower cladding layers 8 to be deposited above and/or below the waveguide core 11. To promote isotropic diffusion, the lower cladding layers 8 may have the same composition and/or the same refractive index as that of the upper cladding layers 12. The isotropy of the refractive index surrounding the waveguide core 11 promotes circular diffusion and a circular waveguide core 13 results.

In other embodiments, a Chemical Vapour Deposition (CVD) method, or a Plasma Enhanced Chemical Vapour Deposition (PECVD) method, or a combination of these methods can be used to form the cladding layers 8 and 12 and the core layer 9. Subsequent thermal processing of the waveguide promotes diffusion of ion dopants from the waveguide core 11 into the surrounding upper cladding and lower cladding layers 8 and 12.

In other embodiments, the lower cladding layer 8 may be only partially consolidated before the core layer 9 is deposited thereon and fully consolidated when the core layer 9 is consolidated. Furthermore, the waveguide core 11 may only be partially consolidated when the upper cladding layer 12 is formed thereon and may be fully consolidated when the upper cladding layer 12 is consolidated. Also, the FHD burner can be used for fusing by passing the burner over the waveguide to fuse the lower cladding and upper cladding layers 8 and 12 and to fuse the core layer 9.

While several embodiments of the present invention have been described and illustrated, it will be apparent to those skilled in the art once given this disclosure that various modifications, changes, improvements and variations may be made without departing from the spirit or scope of this invention.

What is claimed is:

1. A waveguide for an optical circuit comprising:
   a substrate;
   a deposited doped lower cladding layer;
   a doped waveguide core formed from a layer of doped material deposited on the lower cladding layer; and
   a deposited doped upper cladding layer embedding the waveguide core;
   wherein the waveguide core includes mobile dopant ions which have diffused from the deposited doped material of the waveguide core into the upper cladding layer and the lower cladding layer to form an ion diffusion region around said doped waveguide core such that the waveguide core boundary walls are substantially smooth.

2. A waveguide as claimed in claim 1, wherein the ion diffusion region is isotropic with respect to the waveguide core, such that the waveguide core in substantially symmetric about the core axis.

3. A waveguide as claimed in claim 1, wherein the ion diffusion region surrounding the waveguide core forms a substantially rounded waveguide core.

4. A waveguide as claimed in claim 3, wherein the rounded waveguide core is elliptical or circular in cross-section.

5. A waveguide as claimed in claim 1, further including a buffer layer formed on the substrate and wherein the lower cladding layer is formed on the buffer layer.

6. A waveguide as claimed in claim 5, wherein said buffer layer includes a thermally oxidised layer of the substrate.

7. A waveguide as claimed in claim 5, wherein the buffer layer comprises doped silica.

8. A waveguide as claimed in claim 5, wherein the thickness of the buffer layer is in the range 0.2 $\mu$m to 20 $\mu$m.

9. A waveguide as claimed in claim 1, wherein the substrate comprises silicon and/or silica and/or sapphire.

10. A waveguide as claimed in claim 1, wherein the lower cladding layer comprises doped silica.

11. A waveguide as claimed in claim 1, wherein the lower cladding layer includes at least one Phosphorus oxide and at least one Boron oxide and wherein the Phosphorus oxide to Boron oxide ratio is such that the lower cladding layer refractive index is substantially equal to the refractive index of the buffer layer.

12. A waveguide as claimed in claim 1, wherein the lower cladding layer includes doped silica, at least one Phosphorus oxide and at least one Boron oxide and wherein the silica:Phosphorus oxide:Boron oxide ratio is in the range of 75 to 95 wt % silica:1 to 7 wt % Phosphorus oxide:4 to 18 wt % Boron oxide.

13. A waveguide as claimed in claim 12, wherein the lower cladding layer has a silica:Phomphorue oxide:Boron oxide ratio in the range of 80 to 90 wt % silica:2.5 to 6 wt % Phosphorus oxide:7.5 to 14 wt % Boron oxide.

14. A waveguide as claimed in claim 1, wherein the thickness of the lower cladding layer is 1 $\mu$m to 20 $\mu$m.

15. A waveguide as claimed in claim 1, wherein the waveguide core comprises doped silica.

16. A waveguide as claimed in claim 1, wherein said mobile dopant ions of the waveguide core include Phosphorus and/or Fluorine and/or compounds of these elements.

17. A waveguide as claimed in claim 1, wherein dopant ions of the waveguide core include Phosphorus and/or Fluorine and/or Aluminium and/or Boron and/or Germanium and/or Tin and/or Titanium and/or compounds of these elements.

18. A waveguide as claimed in claim 1, wherein the waveguide core includes Phosphorus oxide and/or Boron oxide.

19. A waveguide as claimed in claim 18, wherein the waveguide core comprises $P_2O_5$—$SiO_2$.

20. A waveguide as claimed in claim 1, wherein the refractive index of the waveguide core differs from that of the lower cladding layer by at least 0.05%.

21. A waveguide as claimed in claim 1, wherein the waveguide core includes silica, and at least one Phosphorus oxide and wherein the silica to Phosphorus oxide ratio is in the range of 75 to 95 wt % silica to 5 to 25 wt % Phosphorus oxide.

22. A waveguide as claimed in claim 1, wherein the thickness of the waveguide core is in the range 2 $\mu$m to 60 $\mu$m.

23. A waveguide as claimed in claim 1, wherein the lower cladding layer and the upper cladding layer refractive indices are substantially equal.

24. A waveguide as claimed in claim 1, wherein the waveguide core has a mobile ion dopant concentration higher than the mobile ion dopant concentration of the lower cladding layer or the upper cladding layer.

25. A method of fabricating a waveguide comprising the steps of:
   providing a substrate;
   forming a doped lower cladding layer by deposition;
   forming a doped core layer deposited on the lower cladding layer;
   forming a waveguide core from the core layer;
   depositing a doped upper cladding layer to embed the waveguide core; and
   causing mobile ion dopants included in the core layer to undergo diffusion from the waveguide core into the surrounding upper cladding layer and lower cladding layer to form an ion diffusion region around the waveguide core such that the waveguide core boundary walls are substantially smooth.

26. A method as claimed in claim 25, wherein the diffusion of the said mobile dopant ions from the waveguide core is such that a waveguide core is formed which is substantially symmetric about the core axis.

27. A method as claimed in claim 25, wherein the diffusion of the said mobile dopant ions from the waveguide core swells the boundary walls of the waveguide core.

28. A method as claimed in claim 27, wherein the diffusion of the said mobile dopant ions swells the boundary walls of the waveguide core to form a substantially rounded waveguide core.

29. A method as claimed in claim 28, wherein the rounded waveguide core is elliptical or circular in cross-section.

30. A method as claimed in claim 25, and including the step of forming a buffer layer on the substrate.

31. A method as claimed in claim 30, wherein the lower cladding layer is formed on said buffer layer.

32. A method as claimed in claim 30, wherein said lower cladding layer and said buffer layer are formed substantially in the same step.

33. A method as claimed in claim 25, wherein the steps of forming each of the lower cladding layer, the core layer and the upper cladding layer comprise the steps of:

depositing each layer; and at least partially consolidating each layer.

34. A method as claimed in claim 33, wherein any of the lower cladding layer, the core layer and the upper cladding layer partially consolidated after deposition is fully consolidated with the full consolidation of any other of the lower cladding layer, the core layer or the upper cladding layer.

35. A method as claimed in claim 33, wherein the consolidation of the lower cladding layer is at a temperature or temperatures in the range 950° C. to 1400° C.

36. A method as claimed in claim 35, wherein the consolidation of the lower cladding layer is at a temperature or temperatures in the range 1100° C. to 1350° C.

37. A method as claimed in claim 33, wherein the consolidation of the core layer is at a temperature or temperatures in the range 950° C. to 1400° C.

38. A method as claimed in claim 37, wherein the consolidation of the core layer is at a temperature or temperatures in the range 1100° C. to 1385° C.

39. A method as claimed in claim 33, wherein the consolidation of the upper cladding layer is at a temperature or temperatures in the range 950° C. to 1400° C.

40. A method as claimed in claim 39, wherein the consolidation of the upper cladding layer is at a temperature or temperatures in the range 1100° C. to 1350° C.

41. A method as claimed in claim 33, wherein the temperature or temperature range at which the lower cladding layer is consolidated is greater than the temperature or temperature range at which the core is consolidated.

42. A method as claimed in claim 33, wherein the temperature or temperature range at which the upper cladding layer is consolidated is substantially equal to the temperature or temperature range at which the core layer is consolidated.

43. A method as claimed in claim 33, wherein at least one of the lower cladding layer, the core layer, and the upper cladding layer is deposited by a Flame Hydrolysis Deposition process and/or Chemical Vapour Deposition process.

44. A method as claimed in claim 33, wherein the consolidation is by fusing using a Flame Hydrolysis Deposition burner.

45. A method as claimed in claim 44, wherein the step of fusing the lower cladding layer and the step of fusing the core layer are performed simultaneously.

46. A method as claimed in claim 25, wherein the diffusion of mobile ion dopants in the core layer occurs during the consolidation of the lower cladding layer and/or the upper cladding layer.

47. A method as claimed in claim 25, further comprising at least one thermal processing step after the formation of the upper cladding layer, wherein during said thermal processing of the waveguide the mobile ion dopants in the core layer undergo diffusion into the surrounding layers.

48. A method as claimed claim 25, wherein said mobile dopant ions of the waveguide core include Phosphorus and/or Fluorine and/or compounds of these elements.

49. A method as claimed in claim 25, wherein the ion diffusion region is isotropic with respect to the waveguide core.

50. A method as claimed in claim 25, wherein the waveguide core is formed from the core layer using a dry etching technique comprising a reactive ion etching process and/or a plasma etching process and/or an ion milling process.

* * * * *